United States Patent
Oyama et al.

(10) Patent No.: US 11,396,944 B2
(45) Date of Patent: Jul. 26, 2022

(54) TRANSMISSION SYSTEM

(71) Applicant: Mazda Motor Corporation, Hiroshima (JP)

(72) Inventors: Hajime Oyama, Aki-gun (JP); Kenji Sasaki, Aki-gun (JP); Takeo Moriuchi, Aki-gun (JP); Yasuhiko Shinya, Aki-gun (JP); Tomonari Itagaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/335,841

(22) Filed: Jun. 1, 2021

(65) Prior Publication Data
US 2021/0404552 A1 Dec. 30, 2021

(30) Foreign Application Priority Data
Jun. 30, 2020 (JP) .............................. JP2020-112293

(51) Int. Cl.
*F16H 61/16* (2006.01)
*F16H 59/44* (2006.01)
(Continued)

(52) U.S. Cl.
CPC .............. *F16H 61/16* (2013.01); *F16H 59/44* (2013.01); *F16H 59/48* (2013.01); *F16H 59/66* (2013.01);
(Continued)

(58) Field of Classification Search
CPC .......... F16H 59/44; F16H 59/48; F16H 59/66; F16H 2059/366; F16H 61/16;
(Continued)

(56) References Cited

U.S. PATENT DOCUMENTS

| 5,533,946 A * | 7/1996 | Markyvech | ........... F16H 63/502 74/335 |
| 2003/0101840 A1 * | 6/2003 | Yoshikawa | ......... F16H 59/0204 74/552 |

(Continued)

FOREIGN PATENT DOCUMENTS

JP 2008037312 A 2/2008

Primary Examiner — Edwin A Young
(74) Attorney, Agent, or Firm — Alleman Hall Creasman & Tuttle LLP

(57) ABSTRACT

A transmission system configured to perform a gear change based on a shift operation by an operator is provided, which includes a power transmission system including a transmission and configured to transmit an engine driving force to wheels, a shift operation detecting module, and a transmission controlling module adapted to be executable of a manual rotation synchronizing mode having first and second steps. In the first step, when a first shift operation for changing the transmission to a lower-speed side is detected, the transmission controlling module sends a control signal to a connecting-and-disconnecting mechanism provided to the power transmission system to suspend the transmission of the driving force. In the second step, when a second shift operation is detected, the transmission controlling module sends a control signal to the connecting-and-disconnecting mechanism to resume the transmission of the driving force while the transmission is switched to the lower-speed side.

20 Claims, 7 Drawing Sheets

(51) Int. Cl.
*F16H 59/48* (2006.01)
*F16H 61/02* (2006.01)
*F16H 59/66* (2006.01)
*F16H 59/36* (2006.01)

(52) U.S. Cl.
CPC ... *F16H 61/0213* (2013.01); *F16H 2059/366* (2013.01); *F16H 2061/0244* (2013.01); *F16H 2061/166* (2013.01)

(58) Field of Classification Search
CPC ......... F16H 61/0213; F16H 2061/0244; F16H 2061/166
See application file for complete search history.

(56) References Cited

U.S. PATENT DOCUMENTS

2004/0266583 A1* 12/2004 Henneken ........... F16H 61/0213
477/34
2018/0031119 A1* 2/2018 Maurer .................. F16H 61/16

\* cited by examiner

TRANSMISSION SYSTEM

TECHNICAL FIELD

The present disclosure relates to a transmission system, and particularly to a transmission system which performs a gear change (shifts gear) based on a shift operation by an operator.

BACKGROUND OF THE DISCLOSURE

JP2008-037312A discloses a shift device of an automatic transmission. This shift device is configured to automatically change a gear stage of a stepped transmission according to a traveling state of a vehicle. Moreover, the shift device is provided with a manual mode, and when the manual mode is selected, an operator can operate a paddle shift switch to change the gear stage to a lower-speed or higher-speed gear stage, as needed.

Thus, generally, in the manual mode provided to the automatic transmission, when the paddle shift switch is operated by the operator, a control unit first changes the transmission to a neutral state. Then, the control unit automatically adjusts an engine speed so as to be suitable for the gear stage after the change, and changes the transmission to the gear stage based on the operation by the operator. For example, when the operator operates the paddle shift switch to change the transmission to the lower-speed side while applying a brake, the control unit first shifts the transmission to the neutral, and then actually changes the transmission to the lower-speed side after raising the engine speed. Therefore, generally, in the manual mode of the automatic transmission, the operator can change the transmission to the lower-speed or higher-speed side with the paddle shift switch, without taking the engine speed into consideration.

However, it is one of the operator's pleasures to select a suitable gear stage according to the traveling state or the engine speed while operating the vehicle to change the transmission so that he/she can freely control the vehicle. For example, in order to turn left at an intersection while traveling at a high-speed stage and to accelerate smoothly after the left turn, it is necessary to change the transmission to a lower-speed side in advance. That is, in a manual-transmission vehicle, the operator disengages a clutch while stepping on a brake pedal with the toes and steps on an accelerator pedal with the heel to raise the engine speed, and then connects the clutch after changing the transmission to the lower-speed side. Thus, since the engine speed matches with the rotational speed of the transmission, it becomes possible to smoothly carry out a downshift and accelerate promptly after the left turn. Such a driving skill is referred to as "heel-and-toe," and is performed by skilled operators.

The operator who drives the manual-transmission vehicle will become able to freely control the vehicle as mastering various driving skills like "heel-and-toe." This is his/her pleasure of driving the vehicle. On the other hand, in an automatic-transmission vehicle, such driving skills are unnecessary, even when the mode is selected to the manual mode. Therefore, it is easy to operate but there is a problem that the operator cannot enjoy the pleasure of driving.

SUMMARY OF THE DISCLOSURE

Therefore, one purpose of the present disclosure is to provide a transmission system in which an operator can enjoy the pleasure of driving, even if it is applied to an automatic transmission.

According to one aspect of the present disclosure, a transmission system configured to perform a gear change based on a shift operation by an operator, is provided. The system includes a power transmission system including a transmission and configured to transmit a driving force of an engine to wheels, and a processor configured to execute a shift operation detecting module to detect the shift operation by the operator. The processor is configured to execute a transmission controlling module to perform the gear change based on the shift operation detected by the shift operation detecting module. The transmission controlling module is configured to operate in a manual rotation synchronizing mode. The manual rotation synchronizing mode has a first step in which, when a first shift operation for changing the transmission to a lower-speed side is detected by the shift operation detecting module, the transmission controlling module sends a control signal to a connecting-and-disconnecting mechanism provided to the power transmission system to suspend the transmission of the driving force, and a second step in which, when a second shift operation is detected by the shift operation detecting module, the transmission controlling module sends a control signal to the connecting-and-disconnecting mechanism to resume the transmission of the driving force in a state where the transmission is switched to the lower-speed side.

That is, when switching the transmission to the lower-speed side, the operator performs the gear change and, when the first shift operation for changing the transmission to the lower-speed side is detected by the shift operation detecting module, the transmission controlling module sends the control signal to the connecting-and-disconnecting mechanism to suspend the transmission of the driving force. Then, when the second shift operation is detected by the shift operation detecting module, the transmission controlling module sends the control signal to the connecting-and-disconnecting mechanism to resume the transmission of the driving force in a state where the transmission is switched to the lower-speed side. In this manner, the change of the transmission to the lower-speed side is finished.

According to this configuration, the change of the transmission to the lower-speed side is finished by the first step based on the operator's first shift operation and the second step based on the operator's second shift operation. Moreover, during the execution of the second step where the transmission of the driving force is resumed, it is necessary to match the engine speed of the engine with the rotational speed of the transmission. Therefore, in order to match the engine speed, it is necessary for the operator to perform an operation of an accelerator pedal, etc. When the operator performs the second shift operation in a state where the engine speed of the engine is inappropriate, the vehicle experiences a shock in connection with the execution of the second step, and therefore, the operator senses that his/her driving operation is not appropriate. On the other hand, when the appropriate operation is performed, the change of the transmission to the lower-speed side can be finished without the shock occurring, and therefore, a smooth acceleration is possible. Thus, the operator can enjoy the pleasure of driving and improve his/her driving skills.

The transmission system may further include a transmission mode setting interface, the transmission mode setting interface enabling a selection of an automatic rotation synchronizing mode in which the gear change to the lower-speed side is completed by one shift operation, and the manual rotation synchronizing mode.

According to this configuration, since the automatic rotation synchronizing mode or the manual rotation synchronizing mode can be selected via the transmission mode setting interface, both the demand of the operator who wants to perform comfortable driving with simple operations and the demand of the operator who wants to enjoy the pleasure of driving can be satisfied.

When a given road surface state is detected by a road surface state sensor, the transmission controlling module may perform the automatic rotation synchronizing mode even in a case where the manual rotation synchronizing mode is selected.

According to this configuration, when the given road surface state is detected, the automatic rotation synchronizing mode is performed even if the manual rotation synchronizing mode is selected. Therefore, it can be prevented that the manual rotation synchronizing mode is performed in a situation where strong displeasure is given to the driver and the passenger(s) when the appropriate operation is not performed by the operator, and the comfortableness of the driver and the passenger(s) can be avoided from being significantly affected.

The transmission controlling module may automatically select a gear stage based on one of a vehicle speed and an engine speed, when the second shift operation is not detected within a given period of time after the first shift operation is detected.

According to this configuration, after the first shift operation is performed, when the second shift operation is not performed within the given period of time, since the gear stage is automatically selected, it can be avoided that the vehicle travels for a long period of time while the transmission of the driving force is suspended by the first step. Moreover, since the gear stage is selected based on the vehicle speed or the engine speed, the appropriate gear stage can be set according to the traveling state of the vehicle.

When the engine speed at the time of detecting the second shift operation during the execution of the manual rotation synchronizing mode is below a given engine-speed threshold, the transmission controlling module may maintain the gear stage at the time of detecting the first shift operation, without performing the gear change to the lower-speed side.

According to this configuration, when the engine speed at the time of detecting the second shift operation is below the given engine-speed threshold, since the gear stage is maintained, it can be prevented that the engine stalls or an excessive shock occurs due to the gear change to the lower-speed side while the engine speed is low.

The transmission system may further include a notification device. When the gear stage at the time of detecting the first shift operation is maintained, the processor may be configured to execute an information controlling module to send a signal to the notification device to inform the operator that the shift operation is not appropriate.

According to this configuration, when the engine speed at the time of performing the second shift operation is low and the gear stage is maintained, since the operator is informed of this by the notification device, the operator can recognize that his/her shift operation is not appropriate. Moreover, by informing the maintenance of the gear stage, such an operator's misunderstanding that the gear change has not been performed regardless of having performed the shift operation can be prevented.

The transmission system may further include an acceleration sensor and a notification device. When an acceleration variation above a given acceleration threshold is detected by the acceleration sensor at the time of the execution of the second step, the processor may be configured to execute the information controlling module to send a signal to the notification device to inform the operator that the shift operation is not appropriate.

After the first shift operation is performed, when the engine speed at the time of performing the second shift operation is not appropriate, the shock occurs upon resuming the transmission of the driving force, and the acceleration variation occurs on the vehicle. According to this configuration, when the acceleration variation above the given value is detected at the time of the execution of the second step, since it is informed that the shift operation is not appropriate, the operator can recognize objectively whether or not his/her shift operation is appropriate, and can use it for an improvement in operation skill.

According to one aspect of the present disclosure, a transmission system configured to perform a gear change based on a shift operation by an operator, is provided. The system includes a power transmission system including a transmission and configured to transmit a driving force of an engine to wheels, a notification device configured to inform the operator of information, and a processor. The processor is configured to execute a shift operation detecting module to detect the shift operation by the operator, a transmission controlling module to perform the gear change based on the shift operation detected by the shift operation detecting module, and an information controlling module to control the notification device. The transmission controlling module is configured to operate in a manual rotation synchronizing mode. The manual rotation synchronizing mode has a first step in which, when a first shift operation for changing the transmission to a lower-speed side is detected by the shift operation detecting module, the transmission controlling module sends a control signal to a connecting-and-disconnecting mechanism provided to the power transmission system to suspend the transmission of the driving force, and a second step in which, when a second shift operation is detected by the shift operation detecting module, the transmission controlling module sends a control signal to the connecting-and-disconnecting mechanism to resume the transmission of the driving force in a state where the transmission is switched to the lower-speed side. The transmission controlling module automatically selects the gear stage based on one of a vehicle speed and an engine speed, when the second shift operation is not detected within a given period of time after the first shift operation is detected. When the engine speed at the time of detecting the second shift operation during the execution of the manual rotation synchronizing mode is below a given engine-speed threshold, the transmission controlling module maintains the gear stage at the time of detecting the first shift operation, without performing the gear change to the lower-speed side. When the gear stage at the time of detecting the first shift operation is maintained, the information controlling module sends a signal to the notification device to inform the operator that the shift operation is not appropriate.

DETAILED DESCRIPTION OF THE DISCLOSURE

Figure 1:
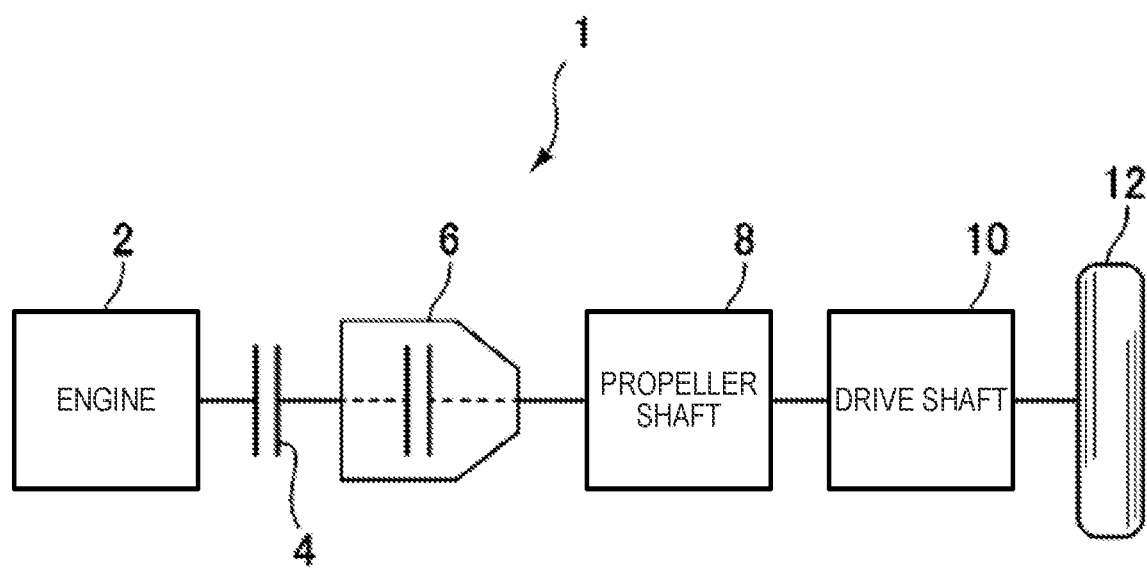
FIG. 1 is a block diagram illustrating a drive system of a vehicle on which a transmission system according to one embodiment of the present disclosure is mounted.
Figure 2:
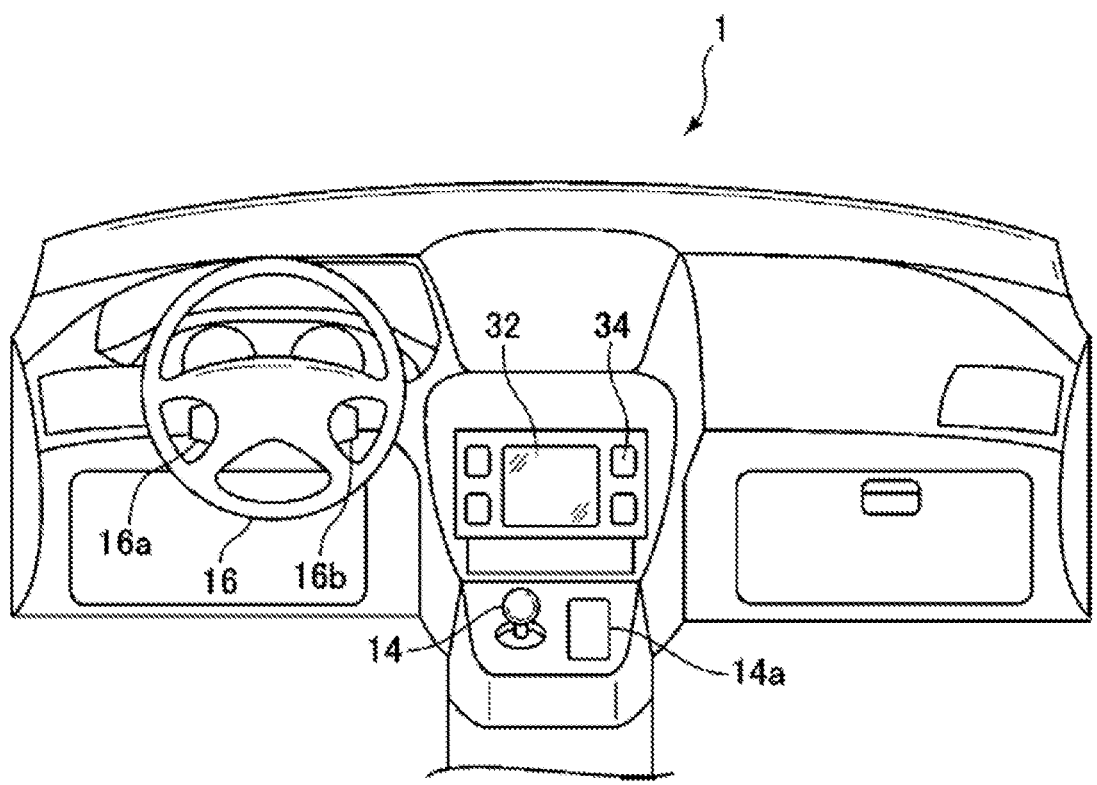
FIG. 2 is a view schematically illustrating a driver's seat of the vehicle on which the transmission system according to this embodiment is mounted.
Figure 3:
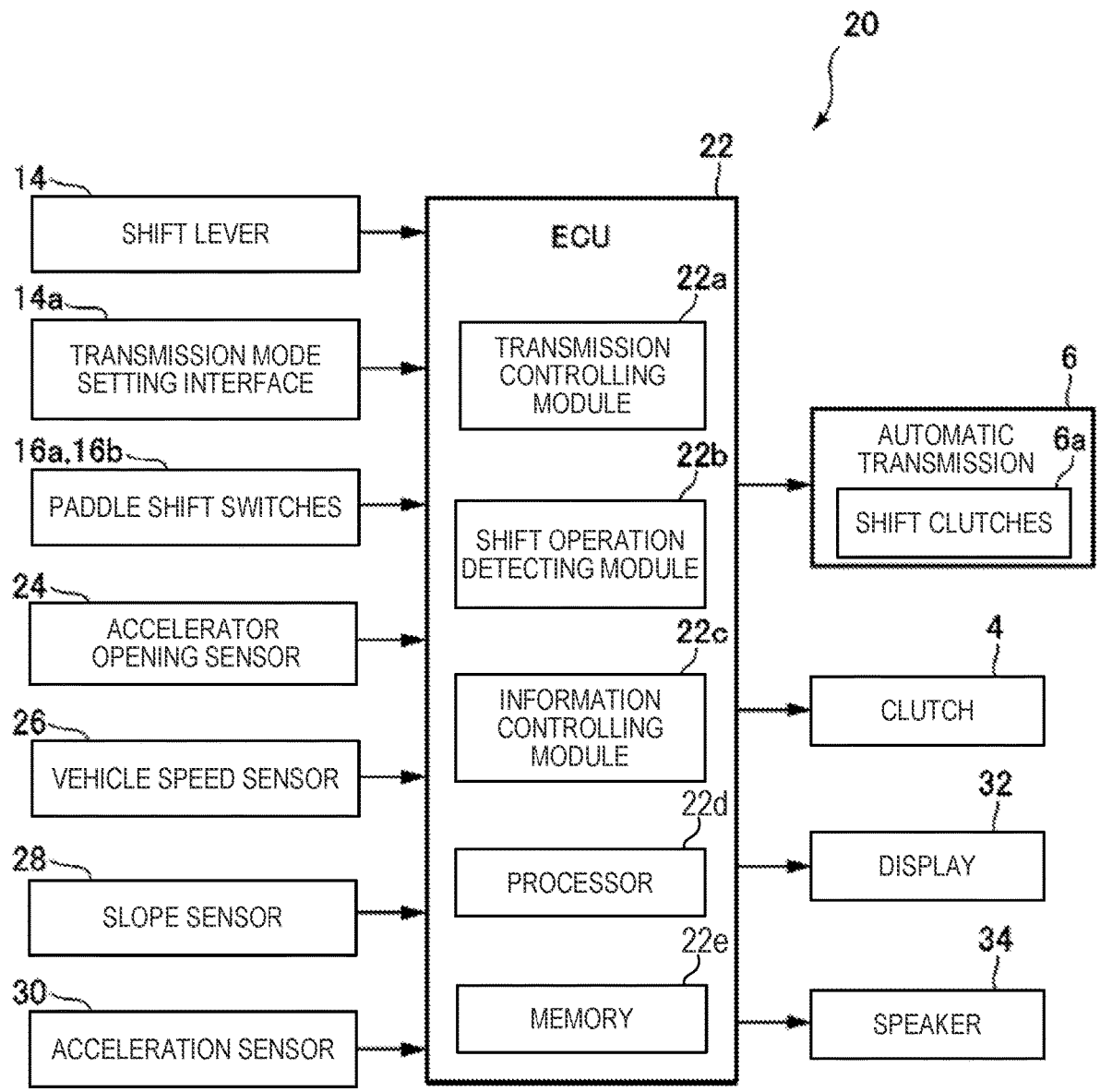
FIG. 3 is a block diagram of the transmission system according to this embodiment.

Next, a transmission system according to one embodiment of the present disclosure is described with reference to the accompanying drawings. FIG. 1 is a block diagram illustrating a drive system of a vehicle on which the transmission system according to this embodiment is mounted. FIG. 2 is a view schematically illustrating a driver's seat of the vehicle on which the transmission system according to this embodiment is mounted. FIG. 3 is a block diagram of the transmission system according to this embodiment.

As illustrated in FIG. 1, a vehicle 1 on which the transmission system according to this embodiment is mounted is an automatic transmission vehicle provided with an engine 2 which is a prime mover, and an automatic transmission 6 which converts a rotational speed of an output shaft of the engine 2. Moreover, the vehicle 1 has a clutch 4 which is a connecting-and-disconnecting mechanism which connects and disconnects the engine 2 and the automatic transmission 6, a propeller shaft 8 and a drive shaft 10 which transmit power of the output shaft of the automatic transmission 6, and wheels 12. Among these, the clutch 4, the automatic transmission 6, the propeller shaft 8, and the drive shaft 10 function as a power transmission system which transmits a driving force of the engine 2 to the wheels 12.

Next, a layout of user interfaces provided to the vehicle 1 is described with reference to FIG. 2. As illustrated in FIG. 2, the vehicle 1 carrying the transmission system of this embodiment is a vehicle of a so-called "floorshift" type in which a shift lever 14 is disposed on a cabin floor between the driver's seat and a passenger seat. By using the shift lever 14, a driver/operator can change the automatic transmission 6 to each gear range including a parking range (P-range), a neutral range (N-range), a reverse range (R-range), and a drive range (D-range). Moreover, paddle shift switches 16a and 16b, which are shift interfaces are provided to a steering wheel 16 of the vehicle 1.

In this embodiment, the automatic transmission 6 is configured so that an "automatic transmission mode" or a "manual mode" can be selected. Moreover, the operator can change the gear stage by the paddle shift switches 16a and 16b while the shift lever 14 is set in the drive range and the "manual mode" is selected. That is, the operator can change the gear to the lower-speed side (downshift) by operating the left paddle shift switch 16a, and can change the gear to the higher-speed side (upshift) by operating the right paddle shift switch 16b. Note that although in this embodiment the change in the gear stage is enabled with the paddle shift switches, the present disclosure may be configured as a modification so that the change in the gear stage is performed using an arbitrary shift interface, such as the shift lever.

Moreover, a transmission mode setting interface 14a is provided near the shift lever 14. When the "manual mode" is selected, an "automatic rotation synchronizing mode" or a "manual rotation synchronizing mode" can be selected via the transmission mode setting interface 14a. Note that although in this embodiment a sole independent user interface is provided as the transmission mode setting interface 14a, the transmission mode setting interface 14a may also be used as other push buttons (not illustrated). In this case, the "automatic rotation synchronizing mode" and the "manual rotation synchronizing mode" can be switched by a special operation, such as a "long push" of a push button. Concrete operation in each mode will be described later.

Next, the transmission system 20 according to this embodiment is described with reference to FIG. 3. As illustrated in FIG. 3, the transmission system 20 includes an ECU (electronic control unit) 22, and also includes the shift lever 14, the transmission mode setting interface 14a, the paddle shift switches 16a and 16b, an accelerator opening sensor 24, a vehicle speed sensor 26, a slope sensor 28, and an acceleration sensor 30, which input a signal into the ECU 22. Moreover, the transmission system 20 also includes the automatic transmission 6 and the clutch 4, and also includes a display 32 and a speaker 34 which are examples of notification devices. Control signals from the ECU 22 are inputted into these components. Moreover, the engine 2 is also connected to the ECU 22 and it is controlled by the control signals.

The accelerator opening sensor 24 detects a stepping amount of the accelerator pedal (not illustrated) of the vehicle 1 equipped with the transmission system 20, and inputs a detection signal into the ECU 22. The vehicle speed sensor 26 detects a vehicle speed (traveling speed) of the vehicle 1 equipped with the transmission system 20, and inputs a detection signal into the ECU 22. The slope sensor 28 detects a slope of a road surface where the vehicle 1 carrying the transmission system 20 travels, and inputs a detection signal into the ECU 22. The acceleration sensor 30 detects an acceleration of the vehicle 1 equipped with the transmission system 20 in a front-and-rear direction, and inputs a detection signal into the ECU 22.

In detail, the ECU 22 is comprised of a processor 22d, memory 22e, an interface circuit, and a program which operates these devices. The processor 22d executes a transmission controlling module 22a, a shift operation detecting module 22b, and an information controlling module 22c to perform their respective functions and these modules are stored in the memory 22e as software.

The transmission controlling module 22a sends a control signal to the automatic transmission 6 to change the gear stage. The shift operation detecting module 22b detects an operation by the operator, of the paddle shift switches 16a and 16b which are the shift interfaces. Moreover, the transmission controlling module 22a performs a gear change or a gear shift based on the shift operation detected by the shift operation detecting module 22b. Moreover, the information controlling module 22c sends control signals to the display 32 and the speaker 34 which are connected to the ECU 22, and informs an operating state of the transmission system 20 to the operator.

As illustrated in FIG. 2, the display 32 is a display unit provided to an instrument panel of the vehicle 1 equipped with the transmission system 20, and presents various information to the operator and passenger(s) of the vehicle 1. The information controlling module 22c built inside the ECU 22 sends a control signal to the display 32 to display various information on the display 32. Moreover, a touch panel display may be used as the display 32 so that an indication and an input of various information are enabled with the display 32. For example, the transmission mode setting interface 14a may be constituted by a command button (not illustrated) displayed on the touch panel.

As illustrated in FIG. 2, the speaker 34 is a voice generator which transmits various information with voice (audio) to the operator and passenger(s) of the vehicle 1. Moreover, the information controlling module 22c built inside the ECU 22 sends a voice signal to the speaker 34 to generate various voices, informing sound, and warning sound (e.g., beep sound).

When the automatic transmission 6 is set to the "automatic mode," the transmission controlling module 22a of the ECU 22 selects a suitable gear stage based on the detection signals detected by the vehicle speed sensor 26 and the accelerator opening sensor 24, and changes the gear stage of the automatic transmission 6. In this embodiment, the automatic transmission 6 is a stepped transmission which changes a power transmission path comprised of a planetary gear mechanism by connecting and disconnecting a plurality of clutches which are shift clutches 6a, and a plurality of brakes. The transmission controlling module 22a changes the gear stage by connecting and disconnecting the clutch 4 and the shift clutches 6a at a given timing.

On the other hand, when the automatic transmission 6 is set to the "manual mode," the transmission controlling module 22a changes the gear stage of the automatic transmission 6 based on the operations of the paddle shift switches 16a and 16b by the operator. In this embodiment, when the paddle shift switch 16a provided at the left side of the steering wheel 16 is operated, the shift operation detecting module 22b detects that the operation for changing the gear of the automatic transmission 6 to the lower-speed side is performed. On the other hand, when the paddle shift switch 16b provided at the right side is operated, the shift operation detecting module 22b detects that the operation for changing the gear of the automatic transmission 6 to the higher-speed side is performed. When the shift operation by the operator is detected by the shift operation detecting module 22b, the transmission controlling module 22a changes the automatic transmission 6 to the lower-speed or the higher-speed side according to the shift operation.

Moreover, in the transmission system 20 of this embodiment, the "automatic rotation synchronizing mode" or the "manual rotation synchronizing mode" can be selected by operating the transmission mode setting interface 14a in the "manual mode" of the automatic transmission 6. In the "automatic rotation synchronizing mode," the gear stage of the automatic transmission 6 can be changed by a single operation of the paddle shift switch by the operator. That is, by operating the paddle shift switch 16a once, the operator can change the automatic transmission 6 to the lower-speed side by one stage, and by operating the paddle shift switch 16b once, he/she can change the automatic transmission 6 to the higher-speed side by one stage.

In the "automatic rotation synchronizing mode," when the operator operates the paddle shift switch 16a to downshift, the transmission controlling module 22a of the ECU 22 first sends the control signal to the clutch 4 to disconnect the clutch 4. Then, the transmission controlling module 22a sends the control signal to the automatic transmission 6 to change the automatic transmission 6 to neutral. Moreover, the transmission controlling module 22a sends the control signal to the engine 2 to control the engine 2 so that the engine speed becomes a speed corresponding to the gear stage after the gear change (a gear stage which is one stage lower). Then, after the transmission controlling module 22a sends the control signal to the automatic transmission 6 to change the gear stage to the one-stage lower, it sends the control signal to the clutch 4 to connect the clutch 4, and finishes the gear change.

Thus, in the "automatic rotation synchronizing mode," the transmission controlling module 22a automatically synchronizes the engine speed of the engine 2 with the rotational speed of the gear stage after the gear change. Therefore, the operator can change the gear stage of the automatic transmission 6 by the single operation of the paddle shift switch, without taking the engine speed of the engine 2 into consideration. Note that, also when the operator operates the paddle shift switch 16b to upshift, similar processing is performed so that the gear stage of the automatic transmission 6 is changed to the higher-speed side.

On the other hand, in the "manual rotation synchronizing mode," the gear stage of the automatic transmission 6 can be changed to the one-stage lower by the operator operating the paddle shift switch 16a twice. Moreover, regarding the change to the higher-speed side via the paddle shift switch 16b, the gear stage of the automatic transmission 6 can be changed by a single operation also when the transmission mode setting interface 14a is set to the "manual rotation synchronizing mode."

Figure 4:
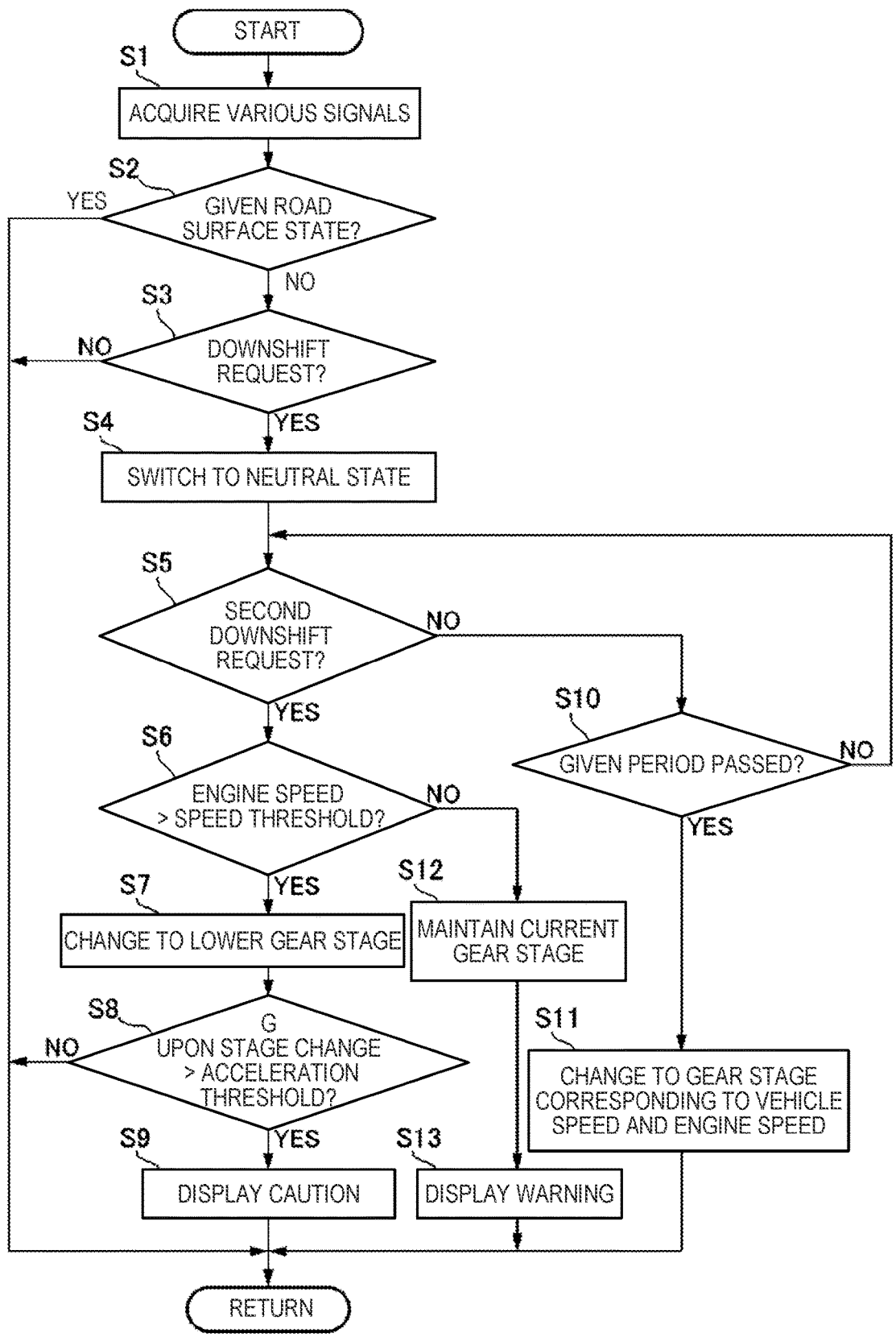
FIG. 4 is a flowchart illustrating processing when a manual rotation synchronizing mode is selected in the transmission system according to this embodiment.

Next, operation of the transmission system 20 according to this embodiment in the "manual rotation synchronizing mode" is described with reference to FIGS. 4 to 8. FIG. 4 is a flowchart illustrating processing when the "manual rotation synchronizing mode" is selected in the transmission system 20 according to this embodiment. FIGS. 5 to 8 are time charts illustrating examples of the operation of the transmission system 20 according to this embodiment in the "manual rotation synchronizing mode."

The flowchart illustrated in FIG. 4 is repeatedly performed by the transmission controlling module 22a of the ECU 22 at a given interval, when the "manual rotation synchronizing mode" is selected via the transmission mode setting interface 14a. Note that in the time chart illustrated in FIGS. 5 to 8, from top, a brake switch signal (a signal of whether the brake pedal is stepped on), operation of the paddle shift switch 16a, the gear stage of the automatic transmission 6, the detection signal of the accelerator opening sensor 24, and the engine speed of the engine 2 are illustrated, where the horizontal axis represents time. Moreover, in FIGS. 5 and 6, solid lines indicate a case where the operator performs an appropriate accelerator operation, and one-dot chain lines indicate a case where the operation is not appropriate.

First, at step S1 of FIG. 4, various signals are read into the ECU 22. The signal read at step S1 includes the signals related to the operations of the shift lever 14 and the paddle shift switches 16a and 16b by the operator, the signal of the accelerator opening from the accelerator opening sensor 24, and the signal related to the speed of the vehicle 1 from the vehicle speed sensor 26. Moreover, the signal read at step S1 includes the signal related to the slope of the traveling road surface from the slope sensor 28, and the signal related to the front-and-rear-direction acceleration of the vehicle 1 from the acceleration sensor 30.

Then, at step S2, it is determined whether a given road surface state is detected. In detail, at step S2, it is determined whether the slope of the traveling road surface detected by the slope sensor 28, which is the road surface state sensor is above a given slope threshold, and whether a road surface friction of the traveling road surface is below a given friction threshold. If the slope is above the given slope threshold, or if the friction is below the given friction threshold, one processing of the flowchart illustrated in FIG. 4 is ended without performing processing at step S3 and the subsequent processings (step S2=YES). In this case, the automatic rotation synchronizing mode is performed, even if the manual rotation synchronizing mode is selected via the transmission mode setting interface 14a. Thus, in the transmission system 20 of this embodiment, if the given road surface state is detected, the automatic rotation synchronizing mode is performed, even if the manual rotation synchronizing mode is selected.

That is, if the manual rotation synchronizing mode is performed on the road surface with a steep slope and a small friction, the operator and the passenger(s) may feel strong discomfort when the shift operation by the operator is not appropriate. In this embodiment, the manual rotation synchronizing mode performed in such a road surface state and the operator and the passenger(s) are given the strong discomfort are avoided. Thus, if the automatic rotation synchronizing mode is performed regardless of the manual rotation synchronizing mode being selected, the display 32 and the speaker 34 may inform the operator of this.

Note that the friction of the traveling road surface can be estimated based on a relation between the driving force of the engine 2 and wheel speeds of the wheels 12. That is, when the road surface friction is small and slips are generated in the wheels 12, the wheel speed increases relative to the driving force generated by the engine 2. Therefore, in this case, the sensor which detects the driving force of the engine 2, the sensor which detects the wheel speed, and a processor which estimates the road surface friction based on the driving force and the wheel speed (none of them is illustrated), function as a road surface state sensor.

Next, after NO at step S2, at step S3, it is determined whether there is any request for a downshift by the operator. That is, it is determined whether the operator's shift operation via the paddle shift switch 16a is detected by the shift operation detecting module 22b. If there is a request for the downshift, the processing shifts to Step S4, and on the other hand, if there is no request for the downshift, one processing of the flowchart illustrated in FIG. 4 is ended. That is, processings at and after step S4 in the flowchart illustrated in FIG. 4 are performed when the paddle shift switch 16a for the downshift is operated by the operator, and on the other hand, it is not performed when the paddle shift switch 16b for the upshift is operated.

Figure 5:
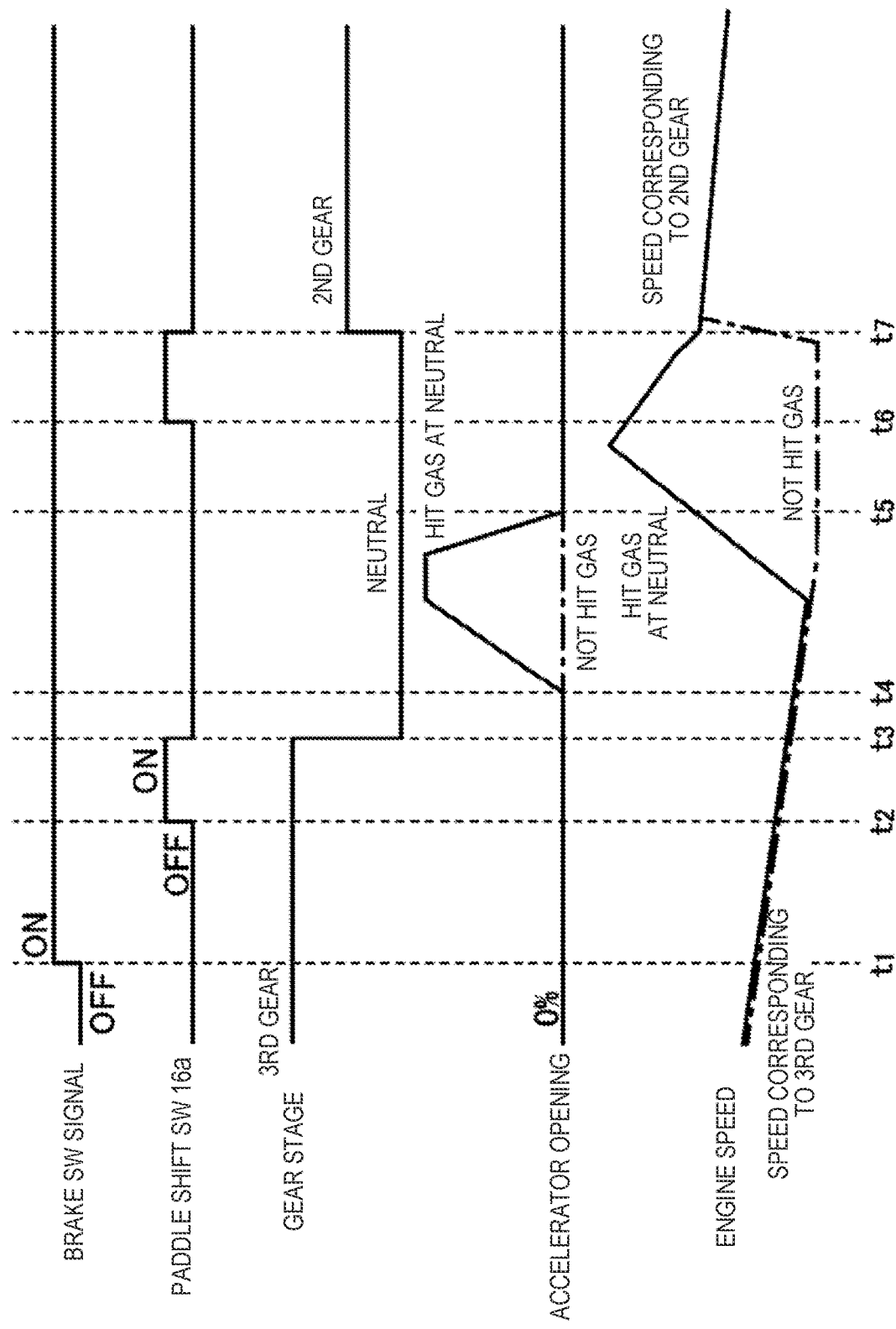
FIG. 5 is a time chart illustrating one example of operation in the manual rotation synchronizing mode of the transmission system according to this embodiment.

In the example illustrated in FIG. 5, the operator steps on the brake pedal (not illustrated) of the vehicle 1 at a time $t_1$ in order to downshift the automatic transmission 6 from third gear to second gear, while decelerating the vehicle 1. Then, the operator operates the paddle shift switch 16a as a first shift operation at a time $t_2$.

If the operation of the paddle shift switch 16a is detected by the shift operation detecting module 22b, the processing of the flowchart illustrated in FIG. 4 shifts to step S4. At step S4, the transmission controlling module 22a sends the control signal to the clutch 4 to disconnect the clutch 4 and stop the transmission of the driving force, as a first step of the manual rotation synchronizing mode. Moreover, the transmission controlling module 22a sends the control signal to the automatic transmission 6 to change the automatic transmission 6 to the neutral state. In the example illustrated in FIG. 5, at a time $t_3$, the clutch 4 is disconnected and the automatic transmission 6 is shifted to the neutral.

Moreover, after operating the paddle shift switch 16a at the time $t_2$, the operator steps on the accelerator pedal (not illustrated) during time $t_4$-$t_5$, as illustrated by the solid line in FIG. 5. Therefore, the engine speed of the engine 2, which fell by stepping-on of the brake pedal from the time $t_1$, increases.

Next, at step S5 of FIG. 4, it is determined whether the paddle shift switch 16a is again operated after the paddle shift switch 16a is operated as the first shift operation at the time $t_2$. If the paddle shift switch 16a is again operated, the processing shifts to step S6, and on the other hand, if not operated, the processing shifts to step S10. At step S10, it is determined whether a given period of time has lapsed after the first-time operation of the paddle shift switch 16a is performed at the time $t_2$. If the given period of time has lapsed, the processing shifts to step S11, and on the other hand, if not lapsed, the processing returns to step S5. Therefore, after the first-time operation of the paddle shift switch 16a, if the paddle shift switch 16a is not operated, the processings at steps S5 shifting to S10 and shifting to S5 are repeated for a given period of time. In this embodiment, 3 seconds is set as the given period of time after the paddle shift switch 16a is operated for the first time.

In the example illustrated by the time chart in FIG. 5, after the first-time operation of the paddle shift switch 16a is performed at the time $t_2$, the second-time operation of the paddle shift switch 16a is performed as a second shift operation at a time $t_6$ before the given period of time is lapsed. Therefore, the processing of the flowchart illustrated in FIG. 4 shifts to step S6 from step S5.

At Step S6, it is determined whether the engine speed of the engine 2 is above a given engine-speed threshold, and if it is above the engine-speed threshold, the processing shifts to step S7, and on the other hand, if it is below the engine-speed threshold, the processing shifts to step S12. In the example illustrated by the time chart in FIG. 5, after operating the paddle shift switch 16a at the time $t_2$, since the operator steps on the accelerator pedal (not illustrated) during the time $t_4$-$t_5$, the engine speed of the engine 2 is increased above the given engine-speed threshold, and therefore, the processing shifts to step S7. At step S7, the transmission controlling module 22a sends the control signal to the automatic transmission 6 to change the automatic transmission 6 to the one-stage lower. Moreover, the transmission controlling module 22a sends the control signal to the clutch 4 to connect the clutch 4 and resume the transmission of the driving force of the engine 2, as a second step of the manual rotation synchronizing mode. In the example illustrated in FIG. 5, at a time $t_7$, the automatic transmission 6 is changed to second gear from third gear, and the clutch 4 then is connected while the automatic transmission 6 is changed to the lower-speed side, and therefore, the transmission of the driving force is resumed.

Next, at step S8, it is determined whether the front-and-rear-direction acceleration of the vehicle 1 detected by the acceleration sensor 30 upon the change in the automatic transmission 6 is above a given acceleration threshold. If the front-and-rear-direction acceleration is above the given acceleration threshold, the processing shifts to Step S9. On the other hand, if it is below the given acceleration threshold, one processing of the flowchart illustrated in FIG. 4 is ended, and the downshift by the operation of the paddle shift switch is ended.

That is, as illustrated by the solid line in FIG. 5, after the first-time operation of the paddle shift switch 16a, when the operator appropriately operates the accelerator pedal (not illustrated) so that the engine 2 is at a suitable engine speed, the vehicle 1 travels smoothly also when the clutch 4 is connected by the second-time operation of the paddle shift switch 16a. In this case, one processing of the flowchart illustrated in FIG. 4 is ended as it is, after step S8. Thus, by performing the first-time operation of the paddle shift switch 16a, the operation of the accelerator pedal (not illustrated), and the second-time operation of the paddle shift switch 16a to downshift and making the vehicle 1 travel smoothly, the operator can enjoy the pleasure of driving as if he/she operates the manual transmission vehicle.

On the other hand, as illustrated by the one-dot chain line in FIG. 5, when the operator does not operate the accelerator pedal (not illustrated) after operating the paddle shift switch 16a at the time $t_2$, the engine speed is kept low. Therefore, when the clutch 4 is connected by the second-time operation of the paddle shift switch 16a, the engine speed deviates largely from the second-gear rotational speed of the automatic transmission 6. In such a case, when the automatic transmission 6 is changed at the time $t_7$ and the clutch 4 is connected, a shock occurs, and this is detected as an acceleration variation in the front-and-rear direction by the acceleration sensor 30.

At step S8 of FIG. 4, if it is determined that the acceleration variation upon the connection of the clutch 4 (time $t_7$ of FIG. 5) is above the given acceleration threshold, the processing shifts to step S9. At step S9, the information controlling module 22c of the ECU 22 sends the signals to the display 32 and the speaker 34, which are the notification devices to inform the operator that the shift operation is not appropriate, and ends one processing of the flowchart illustrated in FIG. 4. Thus, when the acceleration variation above the given acceleration threshold is detected by the acceleration sensor 30 upon the second-time operation of the paddle shift switch 16a, the transmission controlling module 22a sends the signals to the display 32 and the speaker 34, to inform the operator that the shift operation is not appropriate. Therefore, it is possible for the operator to recognize that the shock occurred in the traveling of the vehicle 1 because of his/her inappropriate shift operation, and therefore, he/she can use it for an improvement in operation skill.

Next, one example of the shift operation when downshifting the automatic transmission 6 from third gear to second gear in order to accelerate the vehicle 1 is described with reference to FIG. 6. First, in the example illustrated in FIG. 6, the operator performs the first-time operation of the paddle shift switch 16a as the first shift operation at a time $t_{11}$. Therefore, the processing of the flowchart illustrated in FIG. 4 shifts to step S4 from step S3. At step S4, the transmission controlling module 22a sends the signal to the clutch 4 as the first step of the manual rotation synchronizing mode to stop the transmission of the driving force. Moreover, the transmission controlling module 22a sends the signal to the automatic transmission 6 to change the automatic transmission 6 to the neutral at a time $t_{12}$ of FIG. 6.

Figure 6:
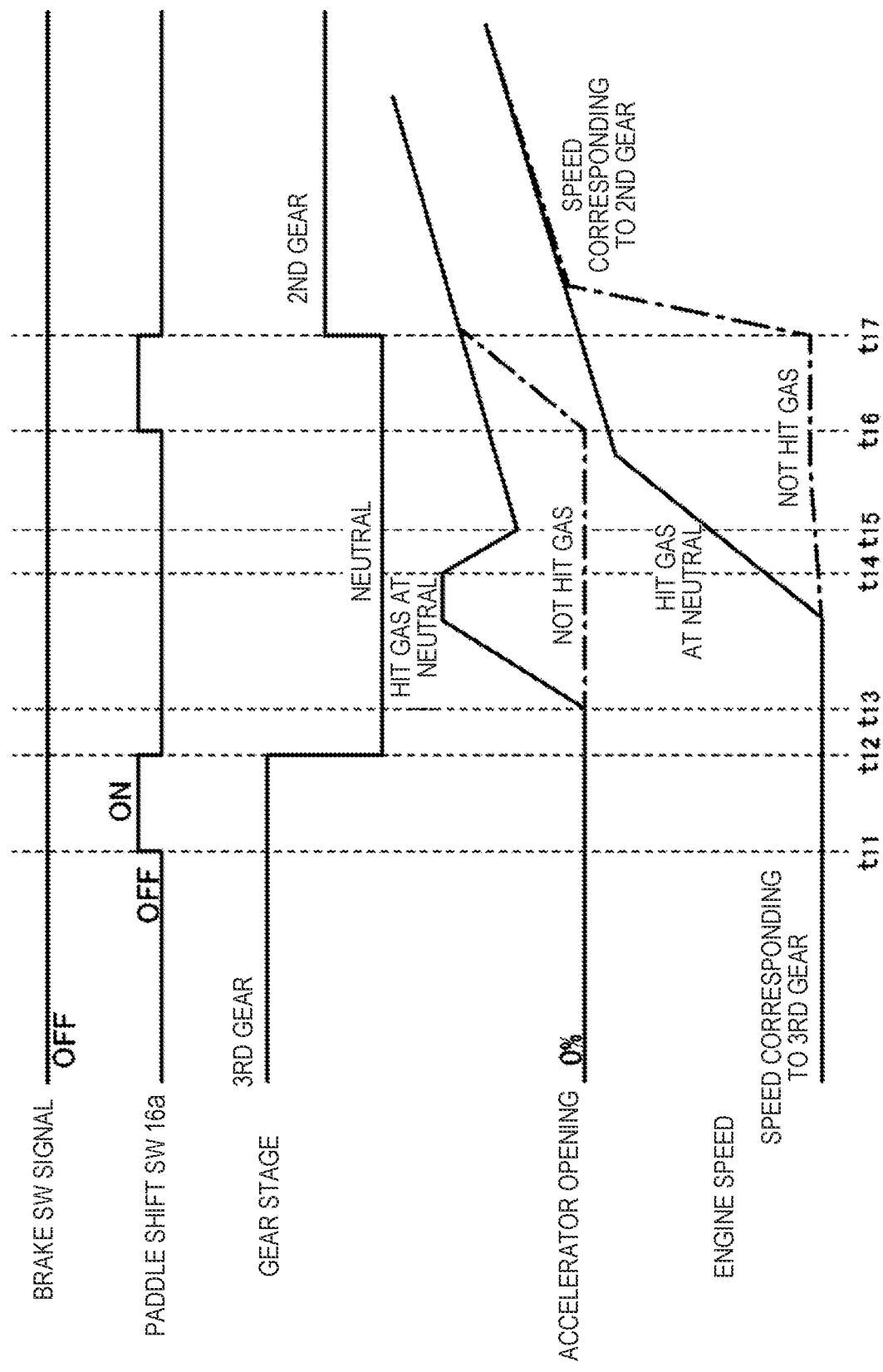
FIG. 6 is a time chart illustrating one example of operation in the manual rotation synchronizing mode of the transmission system according to this embodiment.

Then, as illustrated by the solid line in FIG. 6, in order to raise the engine speed of the engine 2, after the operator starts stepping-on the accelerator pedal (not illustrated) at a time $t_{13}$ and once loosens the stepping-on of the accelerator pedal at a time $t_{14}$, he/she again steps on the accelerator pedal at a time $t_{15}$. Moreover, the operator performs the second-time operation of the paddle shift switch 16a as the second shift operation at a time $t_{16}$. Therefore, the processing of the flowchart illustrated in FIG. 4 shifts to step S6 from step S5.

Moreover, since the operator raises the engine speed of the engine 2, the processing of the flowchart shifts to step S7 from step S6. At step S7, the transmission controlling module 22a sends the signal to the automatic transmission 6 to change the automatic transmission 6 to second gear. Moreover, the transmission controlling module 22a sends the signal to the clutch 4 to connect the clutch 4 and resume the transmission of the driving force, as the second step of the manual rotation synchronizing mode, and therefore, the gear change is finished at a time $t_{17}$ of FIG. 6. Here, since the engine speed of the engine 2 goes up to the engine speed corresponding to second gear of the automatic transmission 6, the downshift can be finished smoothly without the shock occurring on the vehicle 1 (step S8 shifts to RETURN of FIG. 4). Moreover, after the time $t_{15}$, since the operator further steps on the accelerator pedal, the engine speed further goes up and the vehicle 1 is accelerated.

On the other hand, in the example illustrated by the one-dot chain line in FIG. 6, after the operator performs the first-time operation of the paddle shift switch 16a at the time $t_{11}$ (step S3 shifts to S4 of FIG. 4), he/she performs the second-time operation of the paddle shift switch 16a, without stepping-on the accelerator pedal (not illustrated) at the time $t_{16}$ (step S5 shifts to S6 of FIG. 4). In this case, at the time $t_{17}$, the automatic transmission 6 is changed to second gear, and since the engine speed when connecting the clutch 4 deviates largely from the engine speed corresponding to second gear of the automatic transmission 6, the shock occurs when connecting the clutch 4. In this case, since the acceleration detected by the acceleration sensor 30 becomes above the given acceleration threshold (step S8 shifts to S9 of FIG. 4), the operator is informed about the inappropriate shift operation at step S9.

Figure 7:
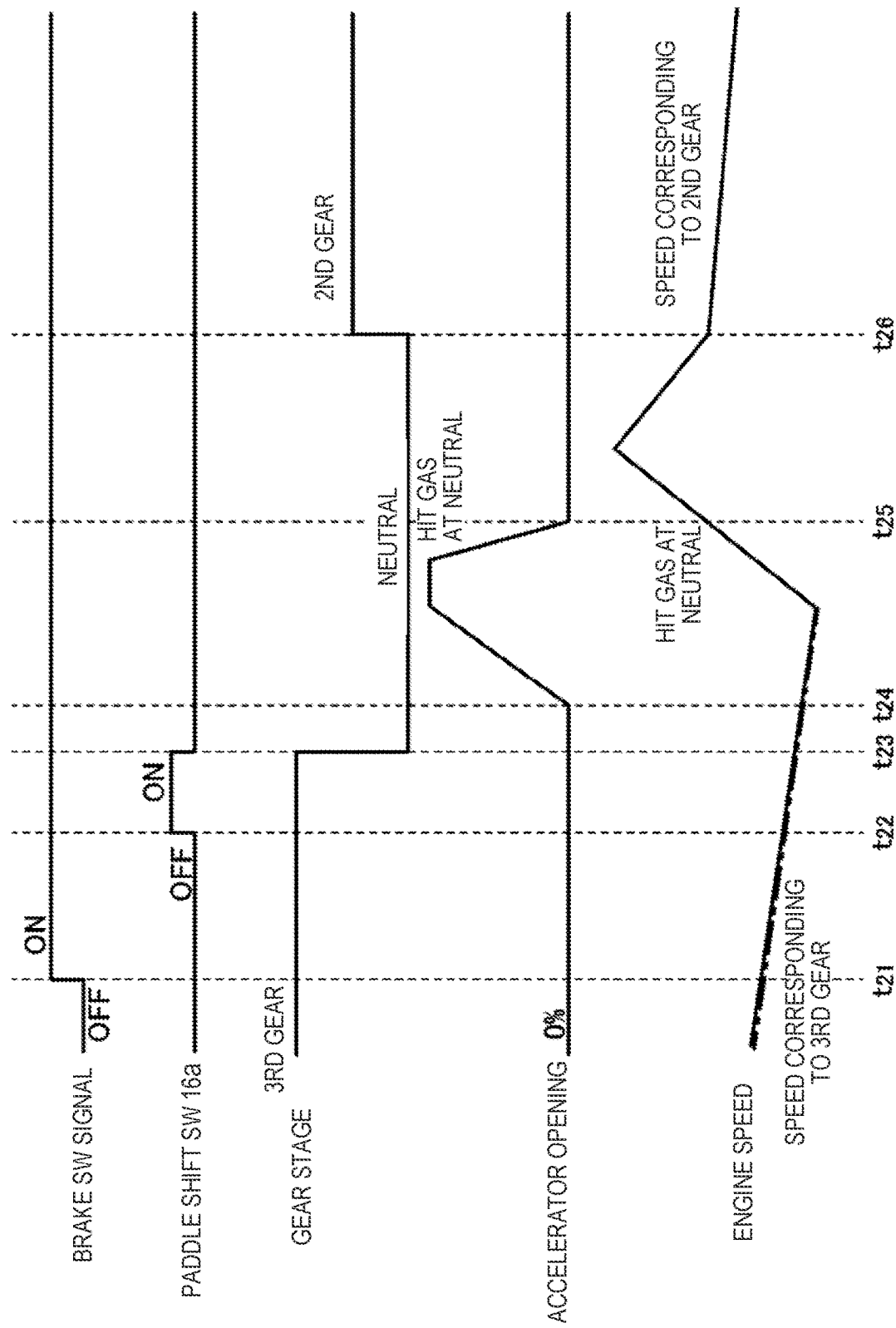
FIG. 7 is a time chart illustrating one example of operation in the manual rotation synchronizing mode of the transmission system according to this embodiment.

Next, one example of operation of the transmission system 20 when the operator mistakes the shift operation is described with reference to FIG. 7. First, in the example illustrated in FIG. 7, the operator steps on the brake pedal (not illustrated) to decelerate the vehicle 1 at a time $t_{21}$. Then, at a time $t_{22}$, the operator performs the first-time operation of the paddle shift switch 16a as the first shift operation. Therefore, the processing of the flowchart illustrated in FIG. 4 shifts to step S4 from step S3. At Step S4, the transmission controlling module 22a sends the signal to the clutch 4 and the automatic transmission 6 to change the automatic transmission 6 to neutral at the time $t_{23}$ of FIG. 7. After step S4, the processing of the flowchart illustrated in FIG. 4 repeats processings at step S5 shifting to S10 and shifting to S5, and waits for the second-time operation of the paddle shift switch 16a by the operator (second shift operation).

On the other hand, the operator steps on the accelerator pedal (not illustrated) at time $t_{24}$-$t_{25}$ to raise the engine speed, but he/she does not perform the second-time operation of the paddle shift switch 16a. Moreover, after the first-time operation of the paddle shift switch 16a at the time $t_{22}$, the processing of the flowchart of FIG. 4 shifts to step S11 at a time $t_{26}$ where the given period of time is lapsed.

At step S11, the transmission controlling module 22a of the ECU 22 selects the appropriate gear stage based on the vehicle speed detected by the vehicle speed sensor 26 and the engine speed, and automatically changes the automatic transmission 6 to the selected gear stage. In the example illustrated in FIG. 7, since the operator raises the engine speed of the engine 2 at the time $t_{24}$-$t_{25}$, second gear is selected by the transmission controlling module 22a, and the automatic transmission 6 is changed to second gear at the time $t_{26}$. Thus, when the second-time operation of the paddle shift switch 16a is not detected within the given period of time after the first-time operation of the paddle shift switch 16a is detected, the transmission controlling module 22a automatically selects the gear stage and changes the gear stage of the automatic transmission 6.

Therefore, the vehicle 1 traveling for a long period of time in a state where the automatic transmission 6 is changed to the neutral can be prevented. Moreover, the transmission controlling module 22*a* automatically selects the gear stage based on the vehicle speed and the engine speed. Note that the gear stage may be selected only based on either the vehicle speed or the engine speed.

Moreover, as a modification, after step S11, the display 32 and the speaker 34 may inform the operator that the second-time operation of the paddle shift switch 16*a* is not performed. Note that in the example illustrated in FIG. 7, since the engine speed at the time $t_{26}$ is high, second gear is selected by the transmission controlling module 22*a*; however, depending on the vehicle speed and the engine speed when the given period of time is lapsed, the gear stage before the first-time operation of the paddle shift switch 16*a* and other gear stages are selected.

Figure 8:
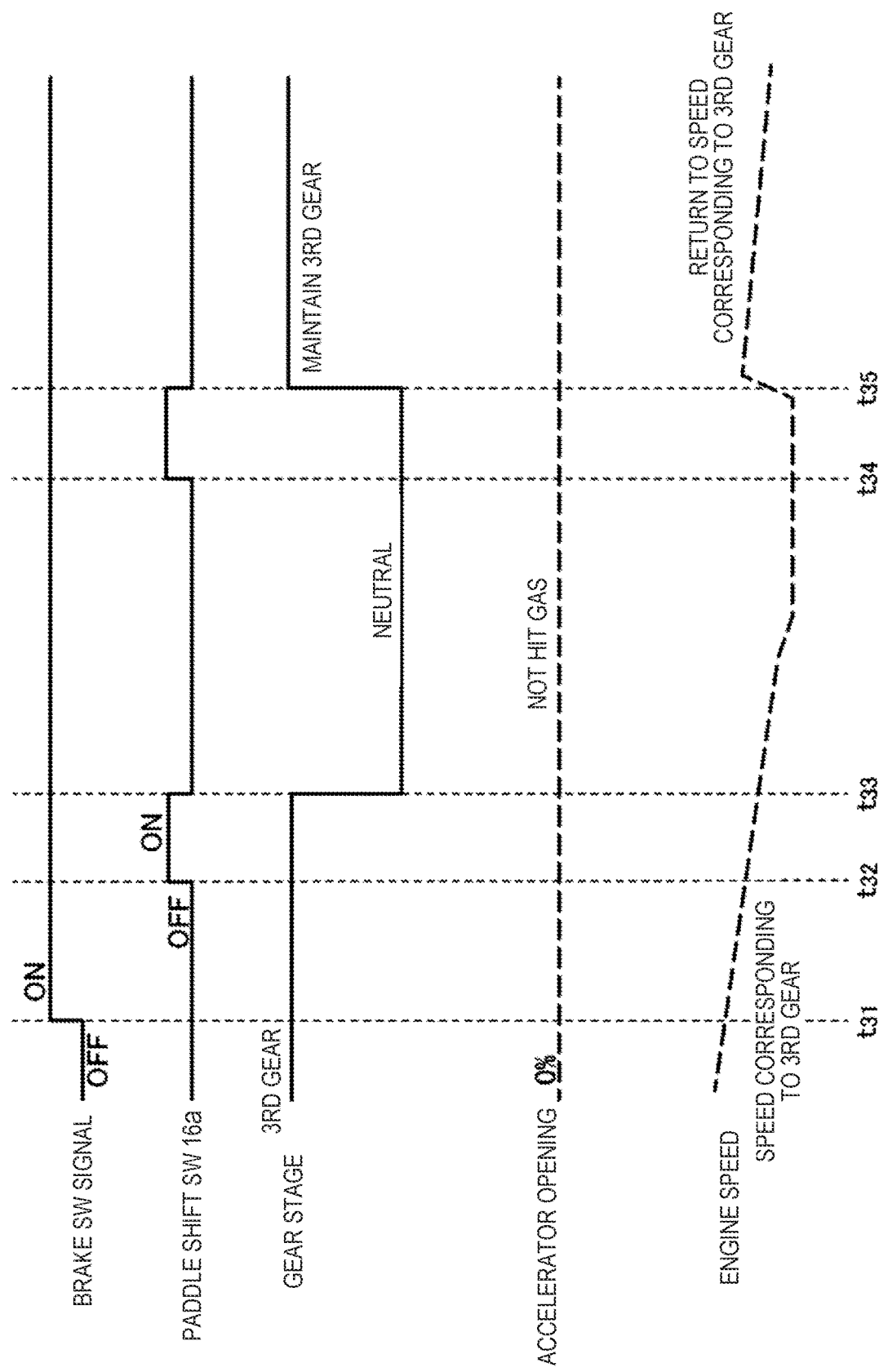
FIG. 8 is a time chart illustrating one example of operation in the manual rotation synchronizing mode of the transmission system according to this embodiment.

Next, referring to FIG. 8, one example of operation of the transmission system 20 when the shift operation is not appropriate and the engine speed falls excessively is described. First, in the example illustrated in FIG. 8, at a time $t_{31}$, the operator steps on the brake pedal (not illustrated) to decelerate the vehicle 1. Then, at a time $t_{32}$, the operator performs the first-time operation of the paddle shift switch 16*a* as the first shift operation. Therefore, the processing of the flowchart illustrated in FIG. 4 shifts to step S4 from step S3. At step S4, the transmission controlling module 22*a* sends the signal to the clutch 4 and the automatic transmission 6 to change the automatic transmission 6 to the neutral at a time $t_{33}$ of FIG. 8.

Here, in the example illustrated in FIG. 8, the operator does not step on the accelerator pedal (not illustrated) after the first-time operation of the paddle shift switch 16*a*. Moreover, in the example illustrated in FIG. 8, since the stepping-on of the brake pedal (not illustrated) by the operator is strong, the engine speed of the engine 2 falls excessively.

Then, at a time $t_{34}$, when the operator performs the second-time operation of the paddle shift switch 16*a* as the second shift operation, the processing of the flowchart illustrated in FIG. 4 shifts to step S6 from step S5. At step S6, it is determined whether the engine speed is above the given engine-speed threshold. In the example illustrated in FIG. 8, since the engine speed of the engine 2 falls excessively and becomes below the given engine-speed threshold at a time $t_{35}$, the processing of the flowchart shifts to step S12.

At step S12, the transmission controlling module 22*a* does not perform a gear change, but changes the automatic transmission 6 from the neutral state to the previous gear stage (third gear in the example of FIG. 8). That is, in the example illustrated in FIG. 8, regardless of having performed the second-time operation of the paddle shift switch 16*a*, the transmission controlling module 22*a* does not perform a downshift, but resumes the automatic transmission 6 to the gear stage at the time of the first-time operation of the paddle shift switch 16*a* (third gear in the example of FIG. 8). This is because the engine speed at the time of the second-time operation of the paddle shift switch 16*a* is extremely low and the engine 2 may stall if the downshift is performed according to the operator's operation. Therefore, when the engine speed at the time of having performed the second-time operation of the paddle shift switch 16*a* is below the given engine-speed threshold, the gear change to the lower-speed side is not performed, but the gear stage at the time of detecting the first-time operation of the paddle shift switch 16*a* is maintained. Therefore, the engine stall due to the operator's inappropriate shift operation can be avoided.

Then, at step S13, the information controlling module 22*c* of the ECU 22 sends the signals to the display 32 and the speaker 34 to inform the operator that the gear change has not been performed since the engine speed becomes below the engine speed at which the downshift is possible, and one processing of the flowchart illustrated in FIG. 4 is ended. Thus, when the gear stage at the time of detecting the first-time operation of the paddle shift switch 16*a* is maintained, the transmission controlling module 22*a* sends the signal to the information controlling module 22*c* to inform the operator that the shift operation is not appropriate. Therefore, the operator can recognize that his/her shift operation is not appropriate, and can use it for an improvement in operation skill.

According to the transmission system 20 of this embodiment, the change of the automatic transmission 6 to the lower-speed side is finished by a first step based on the operator's first-time shift operation (the first shift operation, the time $t_2$ of FIG. 5, etc.), and a second step based on the operator's second-time shift operation (the second shift operation, the time $t_6$ of FIG. 5, etc.). Moreover, during the execution of the second-time shift operation where the transmission of the driving force is resumed, it is necessary to match the engine speed of the engine 2 with the rotational speed of the automatic transmission 6. Therefore, in order to match the engine speed, it is necessary for the operator to perform an operation of the accelerator pedal, etc. (the solid line of the time $t_4$-$t_5$ of FIG. 5, etc.). When the operator performs the second shift operation in a state where the engine speed of the engine 2 is inappropriate (the one-dot chain line after the time $t_7$ of FIG. 5, etc.), a shock occurs on the vehicle 1 in connection with the execution of the second step, and therefore, the operator senses that his/her driving operation is not appropriate. On the other hand, when the appropriate operation is performed, the change of the automatic transmission 6 to the lower-speed side can be finished without the shock occurring, and therefore, a smooth acceleration is possible. Thus, the operator can enjoy the pleasure of driving and improve the driving skills.

Moreover, according to the transmission system 20 of this embodiment, since the automatic rotation synchronizing mode or the manual rotation synchronizing mode can be selected via the transmission mode setting interface 14*a* (FIG. 2), both the demand of the operator who wants to perform comfortable driving with simple operations and the demand of the operator who wants to enjoy the pleasure of driving can be satisfied.

Moreover, according to the transmission system 20 of this embodiment, when the given road surface state is detected (step S2 shifts to RETURN in FIG. 4), the automatic rotation synchronizing mode is performed even if the manual rotation synchronizing mode is selected. Therefore, it can be prevented that the manual rotation synchronizing mode is performed in a situation where strong displeasure is given to the driver and the passenger(s) when the appropriate operation is not performed by the operator, and the comfortableness of the driver and the passenger(s) can be avoided from being significantly affected.

Moreover, according to the transmission system 20 of this embodiment, after the first shift operation (time $t_{22}$ of FIG. 7) is performed, when the second shift operation is not performed within the given period of time (time $t_{22}$-$t_{26}$ of FIG. 7) (step S10 shifts to S11 of FIG. 4), since the gear stage is automatically selected (step S11 of FIG. 4), it can be avoided that the vehicle travels for a long period of time while the transmission of the driving force is suspended. Moreover, since the gear stage is automatically selected based on the vehicle speed or the engine speed, the appropriate gear stage can be set according to the traveling state of the vehicle 1.

Moreover, according to the transmission system 20 of this embodiment, when the engine speed at the time of detecting the second shift operation (time $t_{34}$ of FIG. 8) is below the given engine-speed threshold (step S6 shifts to S12 of FIG. 4), since the gear stage is maintained (step S12 of FIG. 4, time $t_{35}$ of FIG. 8), it can be prevented that the engine 2 stalls or the excessive shock occurs due to the gear change to the lower-speed side while the engine speed is low.

Moreover, according to the transmission system 20 of this embodiment, when the engine speed at the time of performing the second shift operation is low and the gear stage is maintained (step S6 shifts to S12 of FIG. 4), since this is informed by the display 32 and the speaker 34 which are examples of the notification devices (step S13 of FIG. 4), the operator can recognize that his/her shift operation is not appropriate. Moreover, by informing the maintenance of the gear stage, such an operator's misunderstanding that the gear change has not been performed regardless of having performed the shift operation can be prevented.

Moreover, according to the transmission system 20 of this embodiment, when the acceleration variation above the given value is detected at the time of the execution of the second step (step S8 shifts to S9 of FIG. 4), since it is informed that the shift operation is not appropriate (step S9 of FIG. 4), the operator can recognize objectively whether or not his/her shift operation is appropriate, and can use it for an improvement in operation skill.

As described above, although the desirable embodiment of the present disclosure is described, various modifications may be added to the embodiment described above. Particularly, in the embodiment described above, the automatic transmission which changes the gears for transmitting power by connecting and disconnecting the built-in clutches and brakes is provided as the transmission. On the other hand, as a modification, the present disclosure may be applied to a transmission system provided with various types of transmissions, such as a seamless transmission which performs an upshift by temporarily engaging two sets of gears at the same time.

Moreover, in the embodiment described above, the suspension of the driving force transmission in the first step of the manual rotation synchronizing mode and the resumption of the driving force transmission in the second step are performed by the clutch which is the connecting-and-disconnecting mechanism provided apart from the automatic transmission. On the other hand, as a modification, the suspension and the resumption of the driving force transmission may be performed by a connecting-and-disconnecting mechanism provided inside the transmission. Moreover, the present disclosure may also be applied to a transmission system provided with a power transmission system outside of the transmission, which does not have the connecting-and-disconnecting mechanism.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Engine
4 Clutch (Connecting-and-disconnecting Mechanism)
6 Automatic Transmission (Transmission)
6a Shift Clutch
8 Propeller Shaft
10 Drive Shaft
12 Wheel
14 Shift Lever
14a Transmission Mode Setting Interface
16 Steering Wheel
16a, 16b Paddle Shift Switch (Shift Interface)
20 Transmission System
22 ECU
22a Transmission Controlling Module
22b Shift Operation Detecting Module
22c Information Controlling Module
24 Accelerator Opening Sensor
26 Vehicle Speed Sensor
28 Slope Sensor (Road Surface State Sensor)
30 Acceleration Sensor
32 Display (Notification Device)
34 Speaker (Notification Device)

What is claimed is:

1. A transmission system configured to perform a gear change based on a shift operation by an operator, comprising:
 a power transmission system including a transmission and configured to transmit a driving force of an engine to wheels; and
 a processor configured to execute:
  a shift operation detecting module to detect the shift operation by the operator; and
  a transmission controlling module to perform the gear change based on the shift operation detected by the shift operation detecting module,
 wherein the transmission controlling module is configured to operate in a manual rotation synchronizing mode, the manual rotation synchronizing mode being comprised of:
  a first step in which, when a first shift operation for changing the transmission to a lower-speed side is detected by the shift operation detecting module, the transmission controlling module sends a control signal to a connecting-and-disconnecting mechanism provided to the power transmission system to suspend the transmission of the driving force; and
  a second step in which, when a second shift operation is detected by the shift operation detecting module, the transmission controlling module sends a control signal to the connecting-and-disconnecting mechanism to resume the transmission of the driving force in a state where the transmission is switched to the lower-speed side.

2. The transmission system of claim 1, further comprising a transmission mode setting interface, the transmission mode setting interface enabling a selection of an automatic rotation synchronizing mode in which the gear change to the lower-speed side is completed by one shift operation, and the manual rotation synchronizing mode.

3. The transmission system of claim 2, wherein when a given road surface state is detected by a road surface state sensor, the transmission controlling module performs the automatic rotation synchronizing mode even in a case where the manual rotation synchronizing mode is selected.

4. The transmission system of claim 3, wherein the transmission controlling module automatically selects a gear stage based on one of a vehicle speed and an engine speed, when the second shift operation is not detected within a given period of time after the first shift operation is detected.

5. The transmission system of claim 4, wherein when the engine speed at the time of detecting the second shift operation during the execution of the manual rotation synchronizing mode is below a given engine-speed threshold, the transmission controlling module maintains the gear stage at the time of detecting the first shift operation, without performing the gear change to the lower-speed side.

6. The transmission system of claim 5, further comprising a notification device,
wherein when the gear stage at the time of detecting the first shift operation is maintained, the processor is configured to execute an information controlling module to send a signal to the notification device to inform the operator that the shift operation is not appropriate.

7. The transmission system of claim 6, further comprising an acceleration sensor,
wherein when an acceleration variation above a given acceleration threshold is detected by the acceleration sensor at the time of the execution of the second step, the information controlling module sends a signal to the notification device to inform the operator that the shift operation is not appropriate.

8. The transmission system of claim 3, wherein when an engine speed at the time of detecting the second shift operation during the execution of the manual rotation synchronizing mode is below a given engine-speed threshold, the transmission controlling module maintains a gear stage at the time of detecting the first shift operation, without performing the gear change to the lower-speed side.

9. The transmission system of claim 3, further comprising an acceleration sensor and a notification device,
wherein when an acceleration variation above a given acceleration threshold is detected by the acceleration sensor at the time of the execution of the second step, the processor is configured to execute an information controlling module to send a signal to the notification device to inform the operator that the shift operation is not appropriate.

10. The transmission system of claim 2, wherein the transmission controlling module automatically selects a gear stage based on one of a vehicle speed and an engine speed, when the second shift operation is not detected within a given period of time after the first shift operation is detected.

11. The transmission system of claim 2, wherein when an engine speed at the time of detecting the second shift operation during the execution of the manual rotation synchronizing mode is below a given engine-speed threshold, the transmission controlling module maintains a gear stage at the time of detecting the first shift operation, without performing the gear change to the lower-speed side.

12. The transmission system of claim 2, further comprising an acceleration sensor and a notification device,
wherein when an acceleration variation above a given acceleration threshold is detected by the acceleration sensor at the time of the execution of the second step, the processor is configured to execute an information controlling module to send a signal to the notification device to inform the operator that the shift operation is not appropriate.

13. The transmission system of claim 1, wherein the transmission controlling module automatically selects a gear stage based on one of a vehicle speed and an engine speed, when the second shift operation is not detected within a given period of time after the first shift operation is detected.

14. The transmission system of claim 13, wherein when the engine speed at the time of detecting the second shift operation during the execution of the manual rotation synchronizing mode is below a given engine-speed threshold, the transmission controlling module maintains the gear stage at the time of detecting the first shift operation, without performing the gear change to the lower-speed side.

15. The transmission system of claim 13, further comprising an acceleration sensor and a notification device,
wherein when an acceleration variation above a given acceleration threshold is detected by the acceleration sensor at the time of the execution of the second step, the processor is configured to execute an information controlling module to send a signal to the notification device to inform the operator that the shift operation is not appropriate.

16. The transmission system of claim 1, wherein when an engine speed at the time of detecting the second shift operation during the execution of the manual rotation synchronizing mode is below a given engine-speed threshold, the transmission controlling module maintains a gear stage at the time of detecting the first shift operation, without performing the gear change to the lower-speed side.

17. The transmission system of claim 16, further comprising a notification device,
wherein when the gear stage at the time of detecting the first shift operation is maintained, the processor is configured to execute an information controlling module to send a signal to the notification device to inform the operator that the shift operation is not appropriate.

18. The transmission system of claim 16, further comprising an acceleration sensor and a notification device,
wherein when an acceleration variation above a given acceleration threshold is detected by the acceleration sensor at the time of the execution of the second step, the processor is configured to execute an information controlling module to send a signal to the notification device to inform the operator that the shift operation is not appropriate.

19. The transmission system of claim 1, further comprising an acceleration sensor and a notification device,
wherein when an acceleration variation above a given acceleration threshold is detected by the acceleration sensor at the time of the execution of the second step, the processor is configured to execute an information controlling module to send a signal to the notification device to inform the operator that the shift operation is not appropriate.

20. A transmission system configured to perform a gear change based on a shift operation by an operator, comprising:
a power transmission system including a transmission and configured to transmit a driving force of an engine to wheels;
a notification device configured to inform the operator of information; and
a processor configured to execute:
a shift operation detecting module to detect the shift operation by the operator;
a transmission controlling module to perform the gear change based on the shift operation detected by the shift operation detecting module; and
an information controlling module to control the notification device, wherein the transmission controlling module is configured to operate in a manual rotation synchronizing mode, the manual rotation synchronizing mode being comprised of:
- a first step in which, when a first shift operation for changing the transmission to a lower-speed side is detected by the shift operation detecting module, the transmission controlling module sends a control signal to a connecting-and-disconnecting mechanism provided to the power transmission system to suspend the transmission of the driving force; and
- a second step in which, when a second shift operation is detected by the shift operation detecting module, the transmission controlling module sends a control signal to the connecting-and-disconnecting mechanism to resume the transmission of the driving force in a state where the transmission is switched to the lower-speed side, wherein the transmission controlling module automatically selects the gear stage based on one of a vehicle speed and an engine speed, when the second shift operation is not detected within a given period of time after the first shift operation is detected, wherein when the engine speed at the time of detecting the second shift operation during the execution of the manual rotation synchronizing mode is below a given engine-speed threshold, the transmission controlling module maintains the gear stage at the time of detecting the first shift operation, without performing the gear change to the lower-speed side, and wherein when the gear stage at the time of detecting the first shift operation is maintained, the information controlling module sends a signal to the notification device to inform the operator that the shift operation is not appropriate.

* * * * *